Patented June 20, 1939

2,163,385

UNITED STATES PATENT OFFICE 2,163,385

CALCIUM SULPHATE PIGMENTS

Roy W. Sullivan, Richardson Park, Del., assignor to E. I. du Pont de Nemours & Company, Wilmington, Del., a corporation of Delaware No Drawing. Application September 30, 1937, Serial No. 166,564

4 Claims. (Cl. 23—122)

This invention relates to the manufacture of an improved calcium sulphate containing pigment. More specifically it relates to the production of an improved calcium sulphate pigment, the calcium sulphate constituent of which is prepared from a lime slurry (milk of lime) under specially controlled conditions.

The alkalinity of a pigment has an important bearing on the behavior of that pigment in paint vehicles since the alkali present reacts with acids in the vehicles and this tends to cause thickening. In some systems a pigment containing alkaline materials such as free lime may set up into a rigid gel thereby making the resulting paint entirely useless. For this reason, the pH or alkalinity of pigments is an important property which must be carefully controlled. As a general rule the commercial titanium dioxide—calcium sulphate pigments are held at or near the neutral point.

In the manufacture of composite titanium dioxide—calcium sulphate pigments it is desirable to separately prepare the calcium sulphate and to blend it in the wet or dry state, either before or after calcination, with titanium dioxide the pigment properties of which have already been developed such as by calcination. The manufacture of calcium sulphate comprises reacting milk of lime from sulphuric acid. The precipitated calcium sulphate is separated from its acid mother liquor, washed to remove substantially all of the acid, and neutralized with an alkaline material so that the dried or calcined pigment will be substantially neutral.

However, when a calcium sulphate product is prepared in this manner from milk of lime by conventional methods an extremely objectionable phenomenon exhibits itself in the finished calcium sulphate pigment and in the composite calcium sulphate-titanium dioxide pigment. For instance, when the alkalinity of the resulting pigment is tested with phenolphthalein solution, local alkalinity is observed which I call "alkaline spots". These alkaline spots are observed by testing the pigment with a solution of phenolphthalein indicator and they are observed as pink spots in contradistinction to the other major portion of the pigment. Investigation has disclosed that these alkaline spots in the finished calcium sulphate and in the finished calcium sulphate containing pigments are due to the presence of coarsely crystalline calcium hydroxide particles in the milk of lime. This crystalline calcium hydroxide will be referred to by me as "crystalline hydrate". Further investigation has disclosed that crystalline hydrate particles are present to a considerable extent in milk of lime prepared according to prior art methods. In some instances I have found that as much as 25% of the solids in a milk of lime slurry were retained by a 325 mesh screen and that such retained solids consisted largely of crystalline hydrate. I have found that a milk of lime slurry suitable for the production of pigment calcium sulphate or calcium sulphate containing pigments non-objectionable as regards alkaline spots should show a 325 mesh screen residue of not more than 1%.

A further illustration of the adverse effects caused by this crystalline hydrate is seen from an examination of its behavior in the process of making the pigment. This crystalline hydrate does not convert to calcium sulphate but remains as such and is converted to calcium oxide on calcination of the pigment calcium sulphate or of the calcium sulphate containing pigment. As pointed out above, since alkaline materials react with the acids of paint vehicles causing a thickening or gelling effect, the disadvantages caused by the presence of such calcium oxide are obvious.

A still further disadvantage is that the presence of crystalline hydrate in composite pigments results in objectionable grit formation on calcination or drying.

This invention has as an object the production of milk of lime substantially free of crystalline hydrate. A further object is the preparation of pigment calcium sulphate substantially free of crystalline hydrate and substantially free of alkaline spots. A still further object is the preparation of pigment calcium sulphate substantially free of objectionable grittiness associated with the presence of alkaline spots and crystalline hydrate. A still further object is the manufacture of calcium sulphate containing pigments substantially free of crystalline hydrate, alkaline spots and the objectionable grittiness associated therewith. Additional objects will become apparent from a consideration of the following description and claims.

Broadly this invention comprises hydrating quick lime at temperatures within the range of about 50° C. to about 85° C., reacting the milk of lime produced with sulphuric acid, and thereafter separating the precipitated calcium sulphate from the mother acid liquor.

In a more restricted sense the present invention comprises adding both quick lime and water to an agitated vessel. In carrying out my process I prefer to use the so-called pebble lime. The reaction mass is maintained at a temperature between about 50° C. and about 85° C., preferably between about 68° C. and about 78° C. After this process has been operated for a limited period of time, from one to two hours, the reaction mass is removed and the process repeated, thereby operating in a semi-continuous manner. The milk of lime produced should be as concentrated as practical, taking into consideration its handling with conventional pumps and other transfer equipment. I have found that a concentration of from about 12% to about 20% CaO, preferably from about 15% to about 20% CaO, most satisfactory. The milk of lime is then reacted with sulphuric acid to produce calcium sulphate.

I have found that substantial elimination of crystalline hydrate may be had when milk of lime is prepared within a relatively narrow temperature range. I have found that high temperatures tend to accelerate the formation of crystalline hydrate whereas lower temperatures are also objectionable because hydration is slow and incomplete, such incomplete reaction also resulting in objectionable grit in the milk of lime and in the finished pigment. I have found that to attain the desired properties the milk of lime should not be subjected during or after its preparation for any sustained period at temperatures above about 85° C. and in order to realize complete reaction and grit free products the low limit of temperatures should not be less than about 50° C.

A continuous method for commercial production of milk of lime comprises the addition of both quick lime and water to an agitated vessel, the milk of lime being overflowed continuously from the top of said vessel. When operating without due regard to the conditions which I have discovered to be critical, such operation results in a product which is relatively high in crystalline hydrate content and entirely unsuited for the manufacture of pigment calcium sulphate and calcium sulphate containing pigments. Furthermore, such operations produce an extremely variable product with respect to crystalline hydrate and grit content.

While strict adherence to the temperature limitations which I have described minimizes such crystalline hydrate formation resulting from the continuous method used in the commercial production of milk of lime, the greatest benefits of my invention flow from my process when the same is conducted in a semi-continuous manner. That is, after the process has been operated for a limited period of time, from one to two hours, the reaction tank is emptied and the process repeated.

The preferred embodiment of my invention comprises mixing lime, preferably pebble lime, with water, said water being at a temperature bewteen about 35° C. and about 45° C. As soon as the reaction becomes well started, cold water, preferably at a temperature in the range of about 15° C. to about 25° C. is run continuously into the reaction vessel. The temperature of the lime slurry should then be maintained between about 50° C. and about 85° C., preferably between about 68° C. and about 78° C., while continuing to introduce quick lime and water at predetermined rates for obtainment of a relatively concentrated product, preferably a lime slurry of between about 15% and about 20% CaO content. This process in which the milk of lime continuously overflows the reaction vessel at the preferred temperature range of between about 68° C. and 78° C., is continued for about an hour. The operation is then suspended and the reaction vessel emptied and flushed with a small quantity of water. The process is then repeated.

After the milk of lime is prepared it passes through a 16 mesh screen and is reacted with sulphuric acid to produce the modification of calcium sulphate known as insoluble anhydrite. I prefer to have the strength of the sulphuric acid between about 75% and about 80%. The calcium sulphate is then filtered, washed, and the alkalinity adjusted to the desired pH. The alkaline material which I prefer to use in adjusting the alkalinity to the desired pH is a dilute slurry of lime. The calcium sulphate product may then be used as such but for most pigment purposes it is either dried and disintegrated or it is mixed with a prime pigment such as titanium-dioxide followed by drying or calcination and disintegration or alternatively the dried calcium sulphate may be mixed with a prime pigment such as titanium dioxide. By the term "prime pigment" I mean a pigment having a refractive index greater than 2.0.

This invention may be more readily understood from a consideration of the following example.

*Example*

Milk of lime is prepared in a cylindrical tank, 8' deep and 3' in diameter and equipped with a 25 R. P. M. sweep type agitator.

500 gallons of water at 40° C. are introduced into the tank. Pebble lime is then fed into the tank at the rate of 100 lbs. per minute for a period of 5 minutes. The reaction starts and the temperature rises rapidly to about 80° C. to about 85° C. At this point water at a temperature of between 18° C. and 20° C. is introduced continuously into the tank at a rate of approximately 75 gallons per minute. The temperature of the lime slurry then drops to about 68°-78° C. Concurrently with said introduction of water at 18° C.-20° C. quick lime is being fed at the desired rate to maintain the required consistency of the overflow. The process is continued for about an hour, maintaining conditions such that the overflowing slurry is between the temperature range of 68° C. and 78° C., and is then suspended. The tank is then emptied and flushed. This process is then repeated.

After the milk of lime is prepared it is passed through a 16 mesh screen and is reacted with sulphuric acid having a strength between 75% and 80%. The calcium sulphate is then filtered and washed and the alkalinity adjusted with a dilute slurry of lime so that the dried or calcined pigment will be substantially neutral.

It will be noted in the above that the hydration is started with warm water after which the temperature is allowed to drop back so as to maintain a final slurry temperature of about 68° C. to about 78° C. I have discovered that this procedure avoids incomplete hydration at the beginning of the operation and that the short high temperature (about 85° C.) period encountered in the early part of the hydration process is not detrimental with respect to crystal hydrate formation. It is only when this high temperature condition is maintained for a protracted period that the objectionable coarse crystals are developed. Therefore, after the reaction has once started the temperature is gradually brought down by introducing colder water and this water temperature is maintained within such range so as to yield milk of lime at 68° C.–78° C. It will be noticed in the example that the process is discontinued after one hour of continuous operation. At this point the tank is emptied, washed out, and the entire procedure is repeated. This avoids crystalline hydrate formation which results from long continuous operation.

It is to be understood that the aforementioned example may be subjected to variation and modification without departing from the scope of this invention.

For instance, in the example given I have specified that the temperature of the water added to the tank is between 18° C.–20° C. It is to be understood, however, that a temperature as low as 15° C. and as high as 25° C. may be used. However, a temperature below 15° C. is definitely undesirable since such a condition favors crystalline hydrate formation and above 25° C. causes too high a temperature for the slaking operation.

Although the temperature of the water used in the tank at the beginning of the process was 40° C., it is to be understood that a temperature between 30° C.–50° C. may be used without departing from the scope of this invention.

While pebble lime is preferred, other types of calcium oxide such as lump lime may be used.

While maintaining the temperature between about 68° C. to about 78° C. produces optimum results, temperatures as low as about 50° C. and as high as about 85° C. yield a reasonably good product.

Although my preferred commercial method for producing milk of lime is a more or less continuous process for obvious economic and quality considerations (particularly uniformity), it is to be understood that my invention may be for a batch process without departing from the scope of this invention.

The period of operation between tank cleaning is usually determined by a careful check on the the contents of the tank. Samples are removed at intervals and screened to learn the percentage of residue found on a 325 mesh sieve. There will always be a small residue due to coarse and foreign material present in the lime. The screen values disclose any tendency of crystal growth and when the residue is found in excess of 1.5% the operation is suspended, the tank emptied, cleaned, and the operation started anew.

I do not know the exact mechanism by which crystalline hydrate is formed but I have determined that high slaking temperatures are favorable to its formation and there is some manner of "autoseeding" which encourages its formation. If hydration is continued by addition of more lime while maintaining the temperature of the slurry at hay 90° C.–95° C., the crystalline hydrate development accelerates and the size and number of crystals increases very rapidly. I have found as much as 25% of the lime converted into crystals retained on a 325 mesh screen under such conditions.

I have also found that the tendency for crystalline hydrate formation is far more pronounced and objectionable when a relatively concentrated milk of lime is produced directly by the hydration process. When the concentration of the milk of lime is such that the slurry contains more than 10% of CaO and especially when the slurry contains from 15% to 20% of CaO the tendency to form crystalline hydrate is very great. Economical operation of my pigment calcium sulfate process requires that the milk of lime be relatively concentrated, preferably between about 15% to about 20% CaO content, since the amount of acid required to precipitate anhydrite increases markedly as the milk of lime to be reacted therewith is decreased in CaO content. My improved process permits the use of practical economical concentrations of milk of lime to manufacture pigments characterized by the absence of alkaline spots and the grit associated therewith.

Crystalline hydrate is very objectionable in the production of pigment type calcium sulphate. The crystalline material is so coarse and slowly reactive that the reaction with sulphuric acid is incomplete and as a result, coarse crystalline particles remain in the finished pigment calcium sulphate in spite of protracted digestion with sulphuric acid. Milk of lime prepared according to my improved process reacts substantially completely with dilute sulphuric acid. Another difficulty with having crystalline hydrate present is that when the calcium sulphate is calcined the crystalline hydrate is converted to free lime and is objectionable as described earlier.

As many apparently widely different embodiments of this invention may be made without departing from the spirit and scope thereof, it is to be understood that I do not limit myself to the specific embodiments except as defined in the appended claims.

The following is claimed as new and useful:

1. In a process for producing pigment calcium sulphate substantially free from crystalline hydrate the steps which comprise mixing lime with water, said water having a temperature between 30° C. and about 50° C., continuously adding water having a temperature between about 15° C. and about 25° C. and lime to said mixture, controlling the hydration temperature between about 68° C. and about 78° C., maintaining the hydration reaction continuously for a period of time between one and two hours, maintaining the concentration of the milk of lime between about 15% and about 20% CaO content, and thereafter reacting the resulting milk of lime with sulphuric acid having a strength of about 75% to about 80%.

2. In a process for producing pigment calcium sulphate the steps which comprise mixing lime with water, said water having a temperature between 30° C. and about 50° C., continuously adding water having a temperature between about 15° C. and about 25° C. and lime to said mixture, controlling the hydration temperature between about 68° C. and about 78° C., maintaining the hydration reaction continuously for a period of time between one and two hours, maintaining the concentration of the milk of lime between about 15% and about 20% CaO content, reacting the resulting milk of lime with sulphuric acid having a strength of about 75% to about 80%, and thereafter separating the precipitated calcium sulphate from the acid mother liquor.

3. In a process for producing pigment calcium sulphate substantially free from crystalline hydrate the steps which comprise mixing lime with water, said water having a temperature between 30° C. and about 50° C.; continuously adding water having a temperature between about 18° C. and 20° C. and lime to said mixture, controlling the hydration temperature between about 68° C. and about 78° C., maintaining the hydration reaction continuously for a period of time between one and two hours, maintaining the concentration of the milk of lime between about 15% and about 20% CaO content, removing the coarse particles therefrom by passage through a screen, reacting the resulting milk of lime with sulphuric acid having a strength of about 75% to about 80%, separating, washing, and adjusting the alkalinity of the calcium sulphate with a dilute slurry of lime so that the finished pigment will be substantially neutral.

4. In a process for producing pigment calcium sulphate substantially free from crystalline hydrate the steps which comprise reacting lime with water, the temperature of the water employed being such that the hydration temperature is maintained substantially continuously between about 68° C. and about 78° C., maintaining the hydration reaction for a period of time between one and two hours, maintaining the concentration of the milk of lime between about 12% and about 20% CaO content, and thereafter reacting the milk of lime with sulphuric acid.

ROY W. SULLIVAN.